(12) United States Patent
Aoyama et al.

(10) Patent No.: US 12,290,870 B2
(45) Date of Patent: May 6, 2025

(54) PROJECTION NUT FEEDER

(71) Applicant: Shoji Aoyama, Osaka (JP)

(72) Inventors: Shoji Aoyama, Osaka (JP); Yoshitaka Aoyama, Osaka (JP)

(73) Assignee: Shoji Aoyama, Osaka (JP)

( * ) Notice: Subject to any disclaimer, the term of this patent is extended or adjusted under 35 U.S.C. 154(b) by 0 days.

(21) Appl. No.: 18/025,752

(22) PCT Filed: Oct. 28, 2020

(86) PCT No.: PCT/JP2020/040487
§ 371 (c)(1),
(2) Date: Mar. 10, 2023

(87) PCT Pub. No.: WO2022/091262
PCT Pub. Date: May 5, 2022

(65) Prior Publication Data
US 2023/0347441 A1    Nov. 2, 2023

(51) Int. Cl.
*B23K 11/14* (2006.01)
(52) U.S. Cl.
CPC .................................. *B23K 11/14* (2013.01)
(58) Field of Classification Search
CPC ............................... B23K 11/14; B23K 11/36
USPC ....................................... 414/795.4; 221/213
See application file for complete search history.

(56) References Cited

U.S. PATENT DOCUMENTS 6,874,655 B2 *   4/2005   Aoyama ............... B23P 19/006
                                                        219/86.25

FOREIGN PATENT DOCUMENTS

| JP | 60-123402 |   | 8/1985 |   |   |
|----|-----------|---|--------|---|---|
| JP | 2-307684  |   | 12/1990 |   |   |
| JP | 03-026606 |   | 2/1991 |   |   |
| JP | 0326606   | * | 2/1991 | ............ | B23K 11/14 |
| JP | 04-029603 |   | 1/1992 |   |   |
| JP | 2008-173649 |   | 7/2008 |   |   |

OTHER PUBLICATIONS

International Search Report issued Dec. 15, 2020, in International (PCT) Application No. PCT/JP2020/040487, with English translation.
International Preliminary Report on Patentability and Written Opinion of the International Searching Authority issued May 2, 2023 in International (PCT) Application No. PCT/JP2020/040487.
Extended European Search Report issued Jul. 9, 2024 in corresponding European Patent Application No. 20959780.6.

\* cited by examiner

*Primary Examiner* — Lynn E Schwenning
(74) *Attorney, Agent, or Firm* — Wenderoth, Lind & Ponack, L.L.P.

(57) ABSTRACT

An air cylinder is joined to a guide pipe via a joining member. A stopper member is arranged in a position where the guide pipe and a feed pipe for feeding a projection nut are coupled to form a temporary locking chamber of the nut. A sliding rod is integrated with a smaller diameter guide rod and enters a screw hole. Relative positions of the temporary locking chamber and a feed rod are set such that the screw hole of the nut stopped in the temporary locking chamber is coaxial with the feed rod. A gap is formed between the sliding rod and the guide pipe while a support hole is formed in an end part of the guide pipe, and when the feed rod is retracted, the sliding rod is supported in a state where a slight sliding gap is left in the support hole.

2 Claims, 3 Drawing Sheets

PROJECTION NUT FEEDER

TECHNICAL FIELD

The invention relates to a projection nut feeder that feeds a projection nut temporarily locked in a temporary locking chamber to a target feed point such as an electrode of electric resistance welding with a feed rod that is advanced and retracted by an air cylinder.

BACKGROUND ART

JP 2008-173649 A describes that an advance/retract type feed rod operated by an air cylinder is penetrated through a screw hole of a projection nut temporarily locked to a temporary locking chamber to advance the feed rod, and the projection nut sliding down the feed rod is fitted to a guide pin of a fixed electrode.

In the following description, a projection nut may be simply referred to as a nut.

CITATIONS LIST

Patent Literature

Patent Literature 1: JP 2008-173649 A

SUMMARY OF INVENTION

Technical Problems

The feed rod described the above Patent Literature is a type in which a piston rod of an air cylinder is extended as it is, and the piston rod slides over an entire inner surface of a guide pipe joined to the air cylinder.

The length of the piston rod varies depending on the supply destination of the nut. For example, when a long piston rod having a length of 500 mm and a diameter of 10 mm is manufactured, it is necessary to manufacture the piston rod in a straight shape over the entire rod. In order to satisfy such requirements, it is necessary to set the processing accuracy at the time of manufacturing to a remarkably high level. Furthermore, if a slight curve or bend remains in the rod due to residual stress or the like, smooth sliding on a guide pipe inner surface cannot be achieved, and frictional resistance becomes excessive. For this reason, an excessive load is applied to the air cylinder, and the advancing and retracting speed of the rod decreases, leading to deterioration of productivity.

An object of the present invention is to solve the problem of a minute curve or bend of a feed rod, which occurs when an entire sliding rod is formed by a piston rod itself, and to ensure smooth advancing and retracting movement of the feed rod.

Solutions to Problems

One aspect of the invention is characterized in that: an air cylinder in which a piston and a piston rod integrally advance and retract in a cylinder is joined to a hollow guide pipe via a joining member arranged in an end part of the air cylinder; the piston rod is caused to penetrate a sliding hole provided in the joining member to support the piston rod by the piston and the joining member in an advanceable and retractable manner; a stopper member in which a stopper surface is formed is arranged in a position where the guide pipe and a feed pipe for feeding a projection nut are coupled to form a temporary locking chamber of the nut; a feed rod is formed by integrating a sliding rod obtained by elongating the piston rod itself and a guide rod having a diameter smaller than that of the sliding rod and entering a screw hole of the nut; relative positions of the temporary locking chamber and the feed rod are set such that the screw hole of the nut received by the stopper surface and stopped in the temporary locking chamber is coaxial with the feed rod; a gap is formed between the sliding rod and the guide pipe while a support hole having a diameter smaller than an inner diameter of the guide pipe is formed in an end part of the guide pipe on the temporary locking chamber side; and in a state where the feed rod is retracted, the sliding rod is supported in a state where a slight sliding gap is left in the support hole.

Advantageous Effects of Invention

In the invention according to claim 1, the air cylinder in which the piston and the piston rod integrally advance and retract in the cylinder is joined to the hollow guide pipe via the joining member, the stopper member in which the stopper surface is formed is arranged in a position where the guide pipe and the feed pipe for feeding the nut are coupled to form the temporary locking chamber of the nut, the feed rod is formed by integrating the sliding rod obtained by elongating the piston rod itself and the guide rod having a diameter smaller than that of the sliding rod and entering the screw hole of the nut, the sliding rod penetrates the sliding hole of the joining member, relative positions of the temporary locking chamber and the feed rod are set such that the screw hole of the nut stopped in the temporary locking chamber is coaxial with the feed rod, the gap is formed between the sliding rod and the guide pipe while the support hole having a diameter smaller than an inner diameter of the guide pipe is formed in an end part of the guide pipe on the temporary locking chamber side, and when the feed rod is retracted, the slight sliding gap is set between the sliding rod and the support hole.

In a state where the feed rod is retracted, an upper end part of the sliding rod is slid on the inner surface of the cylinder via the piston, and at the cylinder lower end part, the sliding rod is supported in a slidable state via the sliding hole of the joining member. Further, the gap is formed between the sliding rod and the guide pipe, and the support hole having a diameter smaller than the inner diameter of the guide pipe is formed in the end part of the guide pipe on the temporary locking chamber side. In a state where the feed rod is retracted, the sliding rod is supported in a state where the slight sliding gap is left in the support hole.

As described above, when the entire length of the feed rod is viewed, the upper end part is brought into a sliding state via the piston, the intermediate part is supported in a slidable state by the sliding hole of the joining member, and the lower end part is supported by the support hole formed in the guide pipe end part on the temporary locking chamber side. In other words, the long feed rod is supported in a bearing shape at three parts of the part of the piston, the part of the joining member, and the part of the support hole in the guide pipe end part, and other parts are surrounded by space.

Since the gap is formed between the sliding rod and the guide pipe, even if a slight curve or bend remains in the feed rod, the sliding rod is not rubbed against the inner surface of the guide pipe, frictional resistance does not become a problem, and smooth advancing and retracting movement is achieved.

Furthermore, since the slight sliding gap is provided between the sliding rod and the support hole, even if the feed rod is curved or bent, the rubbing section between the sliding rod and the support hole becomes a slight length, and the problem of rubbing resistance is reduced.

According to another aspect of the present invention, a sliding gap between the sliding rod and the support hole is set to be smaller than a gap between the guide rod that has entered the screw hole of the projection nut and the screw hole.

The sliding rod is supported in a state where the slight sliding gap is left in the support hole, and the sliding gap between the sliding rod and the support hole is set to be smaller than the gap between the guide rod that has entered the screw hole and the screw hole. Therefore, even if the sliding rod is tilted and rubs against one side of the inner surface of the support hole, the tip end part of the guide rod does not deviate from the opening circle of the screw hole. When the feed rod advances, the guide rod is normally inserted into the screw hole to penetrate therethrough, and smooth and highly reliable nut feed can be achieved.

Further, the gap is provided between the sliding rod and the guide pipe, and the support hole is formed in an end part of the guide pipe on the temporary locking chamber side in a state of being smaller in diameter than the inner diameter of the guide pipe. For this reason, a space length can be secured as long as possible between the sliding rod and the guide pipe, and even if a slight curve or bend remains in the sliding rod, the sliding rod is not rubbed against the inner surface of the guide pipe. Hence, smooth movement in which frictional resistance does not become a problem is achieved.

DESCRIPTION OF EMBODIMENT

Next, a mode for implementing a projection nut feeder of the present invention will be described.

Embodiment

FIGS. 1 to 7 illustrate an embodiment of the present invention.

First, the projection nut will be described.

Figure 7:
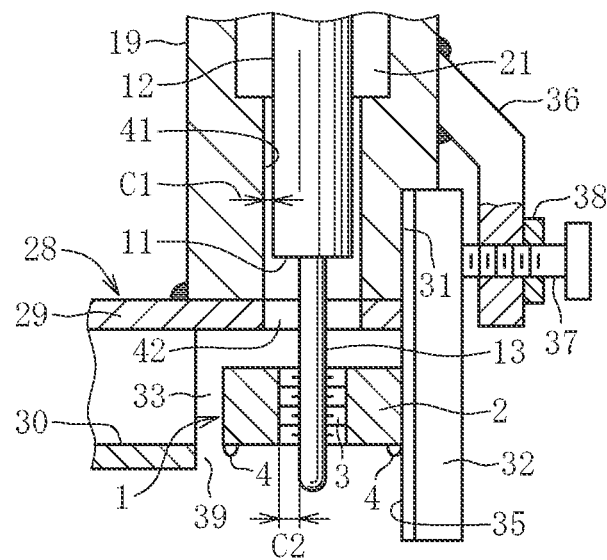
FIG. 7 is a partial cross-sectional view of the device.

FIG. 7 is a diagram for easy understanding. In a nut 1, a screw hole 3 is formed in a center part of a square nut main body 2, and welding protrusions 4 are formed at four corners of the nut main body 2. The nut 1 is made of iron.

Next, an air cylinder will be described.

An air cylinder 5 includes a cylinder 6, a piston 7, a feed rod 8, and a joining member 9. The cylinder 6 is a tubular member having a circular cross section, and the piston 7 is inserted therein in a sliding state. An O-ring 10 formed of synthetic rubber or the like is assembled to the piston 7 to maintain airtightness. The air cylinder 5 is fixed to a stationary member 20 such as a machine frame of an apparatus.

The feed rod 8 is configured in a state where a sliding rod 12 formed by elongating a piston rod and a guide rod 13 having a diameter smaller than that of the sliding rod 12 and entering the screw hole 3 of the nut 1 are integrated. That is, the sliding rod 12 is an elongated piston rod. An extruding surface 11 is formed at a boundary part between the sliding rod 12 and the guide rod 13.

A sliding hole 14 is provided in the joining member 9 arranged in an end part of the cylinder 6, and the sliding rod 12 penetrates the sliding hole 14 in a slidable state. An O-ring 15 formed of synthetic rubber or the like is assembled in the sliding hole 14 to maintain airtightness.

In the joining member 9, a cylinder-side external thread 16, a guide pipe-side external thread 17, and a hexagonal flange 18 between the external threads 16 and 17 are formed. The cylinder-side external thread 16 is screwed into an internal thread formed in an end part of the cylinder 6, the guide pipe-side external thread 17 is screwed into an internal thread formed in an end part of a guide pipe 19, and the air cylinder 5 and the guide pipe 19 are coaxially integrated via the joining member 9. The flange 18 is rotated by a tool to tighten the threads.

When air pressure acts on a first end surface 22 of the piston 7, the feed rod 8 advances. For this purpose, an air port 23 is provided in an end part of the cylinder 6, and an air pipe 24 is connected to the air port 23. When air pressure acts on a second end surface 25 of the piston 7, the feed rod 8 retracts. For this purpose, an air port 26 is provided in an outer peripheral-side end part of the cylinder 6, and an air pipe 27 is connected thereto.

Next, the guide pipe will be described.

The guide pipe 19 is also a tubular member having a circular cross section, and is integrated with the air cylinder 5 as described above. The inner diameter of the guide pipe 19 is set to be larger than the diameter of the sliding rod 12, so that a gap 21 is provided between the sliding rod 12 and the guide pipe 19.

Next, a temporary locking chamber will be described.

Figure 1:
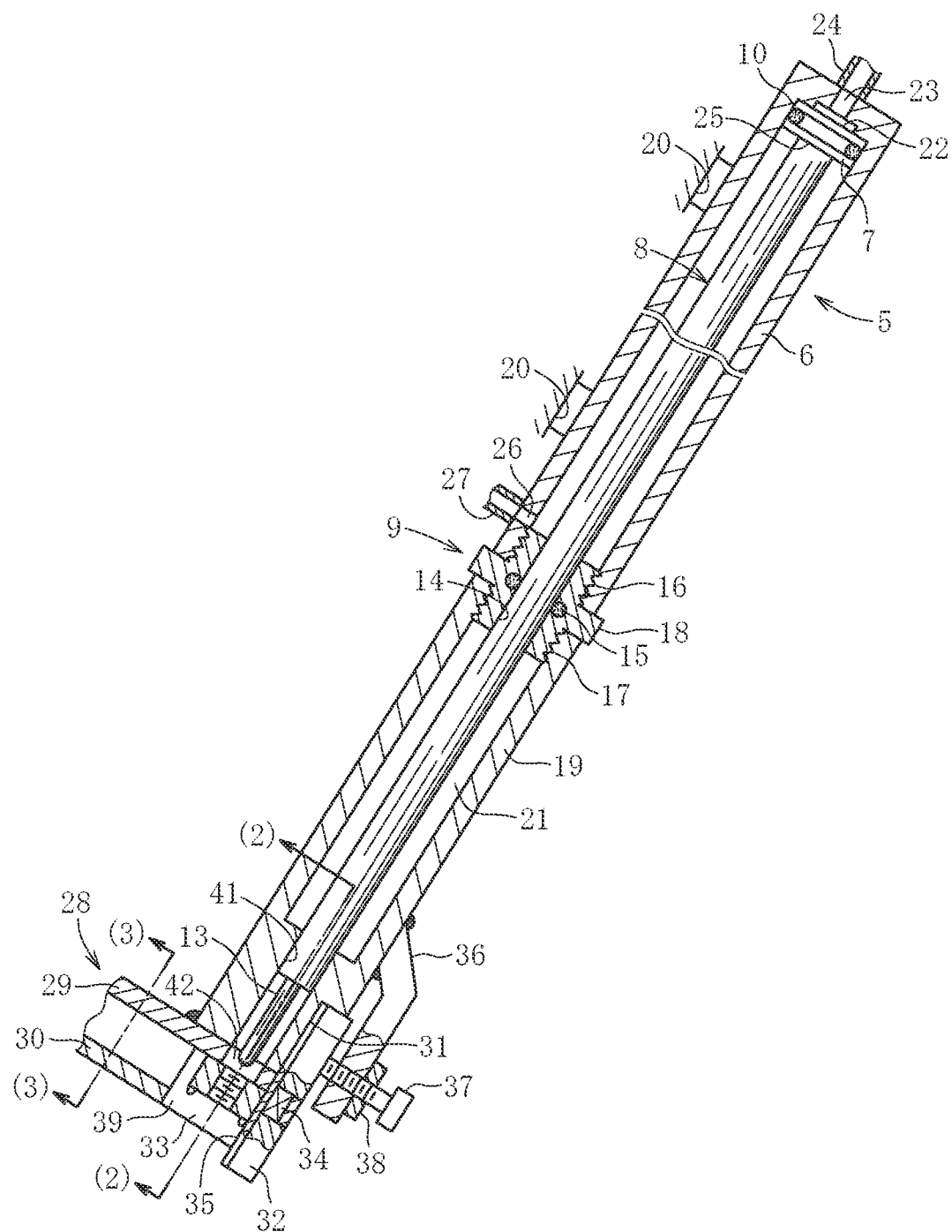
FIG. 1 is a cross-sectional view of an entire device.
Figure 2:
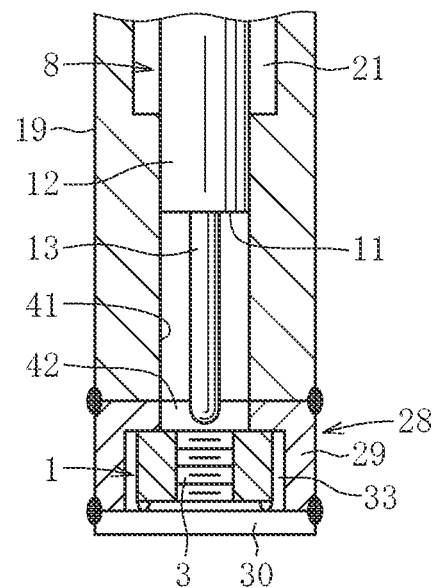
FIG. 2 is a cross-sectional view taken along line (2)-(2) of FIG. 1.
Figure 3:
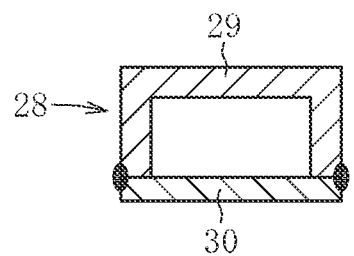
FIG. 3 is a cross-sectional view taken along line (3)-(3) of FIG. 1.
Figure 5:
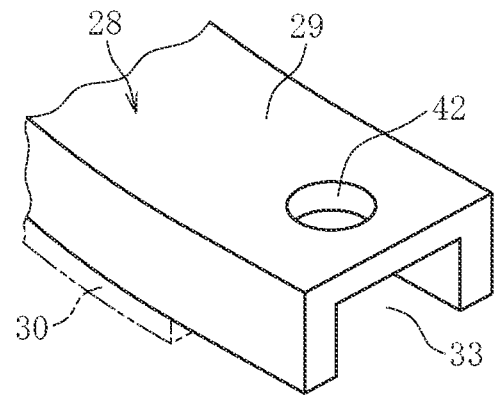
FIG. 5 is a partial perspective view of a feed pipe.
Figure 6:
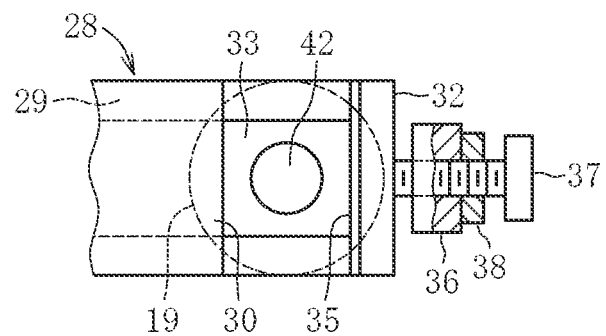
FIG. 6 is a view of a temporary locking chamber as viewed from below.

As illustrated in FIGS. 3 and 5, a feed pipe 28 that feeds the nut 1 has a rectangular cross section, and is coupled to an end part of the guide pipe 19 by welding or the like. In the feed pipe 28, a lid plate 30 is coupled to a feed pipe main body 29 having a U-shaped cross section by welding or the like, and the nut 1 fed from a component supply source such as a part feeder (not illustrated) is conveyed. A part filled in black in each drawing is a welded part.

A flat receiving surface 31 is formed by scraping an end part of an outer peripheral part of the guide pipe 19, and a thick plate-shaped stopper member 32 is pressed thereon. A temporary locking chamber 33 is formed in a position where the guide pipe 19 and the feed pipe 28 are coupled. A stopper surface 35 of the stopper member 32 forms a part of an inner surface of the temporary locking chamber 33. A permanent magnet 34 is embedded in the stopper member 32 to draw the nut 1 from the feed pipe 28 into the temporary locking chamber 33 and attract the nut 1 to the stopper surface 35.

A presser metal fitting 36 is welded to an outer peripheral surface of the guide pipe 19, and the stopper member 32 is pressed against the receiving surface 31 by a fixing bolt 37 screwed into the presser metal fitting 36. Reference numeral 38 denotes a lock nut for preventing loosening. In order to form a nut delivery opening 39 in the temporary locking chamber 33, the lid plate 30 is cut at a position separated from the stopper surface 35.

Relative positions of the temporary locking chamber 33 and the feed rod 8 are set such that the screw hole 3 of the nut 1 received by the stopper surface 35 and stopped at a predetermined position in the temporary locking chamber 33 is coaxial with the feed rod 8. In order to achieve such a positional relationship, relative positions of the stopper surface 35 and a support hole 41 described later are set.

Figure 4:
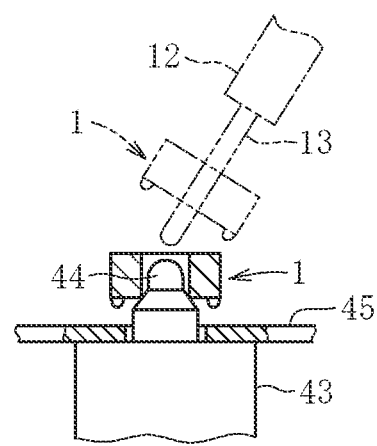
FIG. 4 is a side view illustrating a nut feeding operation.

When the feed rod 8 advances, the guide rod 13 enters the screw hole 3 of the nut 1 temporarily locked to the temporary locking chamber 33, the extruding surface 11 abuts on an upper surface of the nut 1 to extrude the nut 1, and the nut 1 is transferred to a guide pin 44 of a fixed electrode 43 as illustrated in FIG. 4. Reference numeral 45 denotes a steel plate component placed on the fixed electrode 43. Illustration of a movable electrode with respect to the fixed electrode 43 is omitted.

Next, the support hole will be described.

The support hole 41 having a smaller diameter than the inner diameter of the guide pipe 19 is formed in an end part of the guide pipe 19 on the temporary locking chamber 33 side. The support hole 41 is coaxial with a through hole 42 formed in an upper surface part of the feed pipe main body 29. In a state where the feed rod 8 is retracted, as illustrated in FIG. 7, the sliding rod 12 is supported in a state where a slight sliding gap C1 is left in the support hole 41. The sliding gap C1 has a gap dimension capable of absorbing an amount of displacement of an outer peripheral surface of the sliding rod 12 due to a curve or bend even when the feed rod 8 is slightly curved or bent.

For example, when the sliding rod 12 has a length of 500 mm and a diameter of 9 mm, although it is difficult to distinguish the state of a minute curve or bend with the naked eye, there is a case where the curved or bent feed rod axis is deviated by 0.5 mm from a straight virtual axis due to the curve or bend. The sliding gap C1 illustrated in FIG. 7 is large enough to absorb the amount of such a deviation of the axis. In other words, when there is a deviation of 0.5 mm, the outer peripheral surface of the sliding rod 12 advances and retracts while rubbing an inner peripheral surface of the support hole 41. Therefore, the sliding gap C1 is set to 0.5 mm.

Further, as illustrated in FIG. 7, the sliding gap C1 between the sliding rod 12 and the support hole 41 is set to be smaller than a gap C2 between the guide rod 13 that has entered the screw hole 3 of the nut 1 and the screw hole 3.

Note that instead of the air cylinder, an electric motor that moves in an advancing and retracting manner may be employed. In this case, an output shaft of the electric motor corresponds to the piston rod of the air cylinder. It is also possible to replace the permanent magnet with an electromagnet.

The operational effects of the embodiment described above are as follows.

In the structure of the embodiment, the air cylinder 5 in which the piston 7 and the piston rod integrally advance and retract in the cylinder 6 is joined to the hollow guide pipe 19 via the joining member 9, the stopper member 32 in which the stopper surface 35 is formed is arranged in a position where the guide pipe 19 and the feed pipe 28 for feeding the nut 1 are coupled to form the temporary locking chamber 33 of the nut 1, the feed rod 8 is formed by integrating the sliding rod 12 obtained by elongating the piston rod itself and the guide rod 13 having a diameter smaller than that of the sliding rod 12 and entering the screw hole 3 of the nut 1, the sliding rod 12 penetrates the sliding hole 14 of the joining member 9, relative positions of the temporary locking chamber 33 and the feed rod 8 are set such that the screw hole 3 of the nut 1 stopped in the temporary locking chamber 33 is coaxial with the feed rod 8, the gap 21 is formed between the sliding rod 12 and the guide pipe 19 while the support hole 41 having a diameter smaller than an inner diameter of the guide pipe 19 is formed in an end part of the guide pipe 19 on the temporary locking chamber 33 side, and when the feed rod 8 is retracted, the slight sliding gap C1 is set between the sliding rod 12 and the support hole 41.

In a state where the feed rod 8 is retracted, an upper end part of the sliding rod 12 is slid on the inner surface of the cylinder 6 via the piston 7, and at the cylinder lower end part, the sliding rod 12 is supported in a slidable state via the sliding hole 14 of the joining member 9. Further, the gap 21 is formed between the sliding rod 12 and the guide pipe 19, and the support hole 41 having a diameter smaller than the inner diameter of the guide pipe 19 is formed in the end part of the guide pipe 19 on the temporary locking chamber 33 side. In a state where the feed rod 8 is retracted, the sliding rod 12 is supported in a state where the slight sliding gap C1 is left in the support hole 41.

As described above, when the entire length of the feed rod 8 is viewed, the upper end part is brought into a sliding state via the piston 7, the intermediate part is supported in a slidable state by the sliding hole 14 of the joining member 9, and the lower end part is supported by the support hole 41 formed in the guide pipe end part on the temporary locking chamber 33 side. In other words, the long feed rod 8 is supported in a bearing shape at three parts of the part of the piston 7, the part of the joining member 9, and the part of the support hole 41 in the guide pipe end part, and other parts are surrounded by space.

Since the gap 21 is formed between the sliding rod 12 and the guide pipe 19, even if a slight curve or bend remains in the feed rod 8, the sliding rod 12 is not rubbed against the inner surface of the guide pipe 19, frictional resistance does not become a problem, and smooth advancing and retracting movement is achieved.

Furthermore, since the slight sliding gap C1 is provided between the sliding rod 12 and the support hole 41, even if the feed rod 8 is curved or bent, the rubbing section between the sliding rod 12 and the support hole 41 becomes a slight length, and the problem of rubbing resistance is reduced.

The sliding gap C1 between the sliding rod 12 and the support hole 41 is set to be smaller than the gap C2 between the guide rod 13 that has entered the screw hole 3 of the nut 1 and the screw hole 3.

The sliding rod 12 is supported in a state where the slight sliding gap C1 is left in the support hole 41, and the sliding gap C1 between the sliding rod 12 and the support hole 41 is set to be smaller than the gap C2 between the guide rod 13 that has entered the screw hole 3 and the screw hole 3. Therefore, even if the sliding rod 12 is tilted and rubs against one side of the inner surface of the support hole 41, the tip end part of the guide rod 13 does not deviate from the opening circle of the screw hole 3. When the feed rod advances, the guide rod 13 is normally inserted into the screw hole 3 to penetrate therethrough, and smooth and highly reliable nut feed can be achieved.

Further, the gap 21 is provided between the sliding rod 12 and the guide pipe 19, and the support hole 41 is formed in an end part of the guide pipe 19 on the temporary locking chamber 33 side in a state of being smaller in diameter than the inner diameter of the guide pipe 19. For this reason, a space length can be secured as long as possible between the sliding rod 12 and the guide pipe 19, and even if a slight curve or bend remains in the sliding rod 12, the sliding rod is not rubbed against the inner surface of the guide pipe.

Hence, smooth movement in which frictional resistance does not become a problem is achieved.

According to a further aspect of the projection nut feeder of the present invention, an air cylinder in which a piston and a piston rod integrally advance and retract in the cylinder is joined to a hollow guide pipe via a joining member arranged in an end part of the air cylinder, the piston rod is caused to penetrate a sliding hole provided in the joining member to support the piston rod by the piston and the joining member in an advanceable and retractable state, a stopper member in which a stopper surface is formed is arranged in a position where the guide pipe and a feed pipe for feeding a projection nut are coupled, to form a temporary locking chamber of the nut, a feed rod is formed by integrating a sliding rod obtained by elongating the piston rod itself and a guide rod having a diameter smaller than that of the sliding rod and entering a screw hole of the nut, the sliding rod having a minute curve or bend, relative positions of the temporary locking chamber and the feed rod are set such that the screw hole of the nut received by the stopper surface and stopped in the temporary locking chamber is coaxial with the feed rod, a gap is formed between the sliding rod and the guide pipe, while a support hole having a diameter smaller than an inner diameter of the guide pipe is formed in an end part of the guide pipe on the temporary locking chamber side, a length of the gap between the sliding rod and the guide pipe as viewed in a length direction of the sliding rod is set to be longer than a length of the support hole by forming the support hole in a member in an end part of the guide pipe on the temporary locking chamber side where the gap is not formed, in a state where the feed rod is retracted, the sliding rod is supported in a state where a slight sliding gap is left in the support hole, the sliding gap has a gap dimension capable of absorbing an amount of displacement of an outer peripheral surface of the sliding rod due to a curve or a bend, when an entire length of the feed rod is viewed, an upper end part is slid on the cylinder via the piston, an intermediate part is supported in a slidable state by the sliding hole of the joining member, and a lower end part is supported at three parts of the support hole formed in the guide pipe end part on the temporary locking chamber side, and the sliding gap between the sliding rod and the support hole is set to be smaller than a gap between the guide rod that has entered the screw hole of the nut and the screw hole.

INDUSTRIAL APPLICABILITY

As described above, according to the device of the present invention, the problem of a minute curve or bend of a feed rod, which occurs when an entire sliding rod is formed by a piston rod itself, is solved, and smooth advancing and retracting movement of the feed rod is secured. Therefore, the device of the present invention can be used in a wide industrial field such as a vehicle body welding process of an automobile and a sheet metal welding process of a household electrical appliance.

REFERENCE SIGNS LIST

1 Projection nut
2 Nut main body
3 Screw hole
4 Welding protrusion
5 Air cylinder
6 Cylinder
7 Piston
8 Feed rod
9 Joining member
12 Sliding rod
13 Guide rod
14 Sliding hole
19 Guide pipe
21 Gap
28 Feed pipe
32 Stopper member
33 Temporary locking chamber
35 Stopper surface
41 Support hole
C1 Sliding gap
C2 Gap between guide rod and screw hole

The invention claimed is:

1. A projection nut feeder comprising:
an air cylinder in which a piston and a piston rod integrally advance and retract in a cylinder, and a hollow guide pipe joined to the cylinder via a joining member, the joining member having a sliding hole for supporting the piston rod while allowing the piston rod to slide in an advanceable and retractable manner;
a stopper member having a stopper surface, the stopper member being arranged at a position where the hollow guide pipe and a feed pipe for feeding a projection nut are coupled to each other, to form a temporary locking chamber of the projection nut; and
a feed rod constituted by a sliding rod of an extended portion of the piston rod and a guide rod having a diameter smaller than that of the sliding rod so that the guide rod is capable of entering into a screw hole of the projection nut,
wherein a relative position between the temporary locking chamber and the feed rod is set such that the screw hole of the projection nut received by the stopper surface and stopped at a predetermined position in the temporary locking chamber is coaxial with the feed rod,
wherein the hollow guide pipe has an inner diameter to form a gap between the sliding rod and the hollow guide pipe, and the hollow guide pipe has a support hole for supporting the sliding rod while allowing the sliding rod to slide, the support hole being formed at an end part of the hollow guide pipe on a temporary locking chamber side and having a diameter smaller than the inner diameter of the hollow guide pipe to form a sliding gap between the sliding rod and the support hole even in a state where the feed rod is retracted,
wherein, in an axial direction of the hollow guide pipe, a length of the support hole is smaller than a length of the gap between the sliding rod and the hollow guide pipe, the length of the gap being defined between the joining member and the support hole, and
wherein the feed rod including the piston is always supported at three positions such that an upper end part of the feed rod is supported by the cylinder via the piston, an intermediate part of the feed rod is supported by the sliding hole of the joining member, and a lower end part of the feed rod is supported by the support hole.

2. The projection nut feeder according to claim 1, wherein the sliding gap between the sliding rod and the support hole is smaller than another gap between the guide rod that has entered the screw hole of the projection nut and the screw hole.

* * * * *